(12) United States Patent
Anglin et al.

(10) Patent No.: US 9,910,666 B1
(45) Date of Patent: Mar. 6, 2018

(54) IMPLEMENTING LOCALE MANAGEMENT ON PAAS: LIVE LOCALE OBJECT UPDATE

(71) Applicant: International Business Machines Corporation, Armonk, NY (US)

(72) Inventors: Debbie A. Anglin, Austin, TX (US); Vishal C. Aslot, Austin, TX (US); Yu Gu, Cedar Park, TX (US); Su Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 15/243,849

(22) Filed: Aug. 22, 2016

(51) Int. Cl.
G06F 9/445 (2018.01)

(52) U.S. Cl.
CPC ..................... *G06F 8/67* (2013.01)

(58) Field of Classification Search
CPC ....................................................... G06F 8/67
USPC ........................................................ 717/168
See application file for complete search history.

(56) References Cited

U.S. PATENT DOCUMENTS

| | | | |
|---|---|---|---|
| 5,613,122 A * | 3/1997 | Burnard ................ | G06F 9/4448 713/1 |
| 6,408,333 B1 | 6/2002 | St. Clair | |
| 7,194,506 B1 * | 3/2007 | White ............... | G06F 17/30893 709/203 |
| 7,243,142 B2 * | 7/2007 | Poirot ................... | H04L 41/044 709/220 |
| 7,363,487 B2 | 4/2008 | Venkataramappa et al. | |
| 7,774,195 B2 | 8/2010 | Kohlmeier et al. | |
| 7,818,736 B2 | 10/2010 | Appavoo et al. | |
| 7,913,235 B2 | 3/2011 | Rose et al. | |
| 8,261,353 B2 | 9/2012 | Hirsave et al. | |
| 8,510,371 B2 | 8/2013 | Peled | |
| 9,141,352 B2 | 9/2015 | Bromley, Jr. et al. | |
| 2013/0174136 A1 | 7/2013 | Atkin et al. | |
| 2013/0332917 A1 * | 12/2013 | Gaither ..................... | G06F 8/67 717/170 |
| 2014/0365966 A1 * | 12/2014 | Deng .................... | G06F 9/4448 715/811 |
| 2015/0089375 A1 | 3/2015 | Liu et al. | |
| 2015/0116329 A1 | 6/2015 | Barrat et al. | |
| 2015/0169317 A1 | 6/2015 | Barrat et al. | |
| 2015/0268947 A1 | 10/2015 | Ionescu | |

OTHER PUBLICATIONS

Arnold, J. B., "Ksplice: An automatic system for rebootless kernel security updates" (Doctoral dissertation, Massachusetts Institute of Technology), 2008.
Vaughan-Nichols, S. J., "KernelCare: New no-reboot Linus patching system", ZDNet, Jul. 2014.
(Continued)

*Primary Examiner* — Qing Chen
*Assistant Examiner* — Clint Thatcher
(74) *Attorney, Agent, or Firm* — Joan Pennington (57) ABSTRACT

A method and apparatus are provided for implementing system locale management including live locale object update in a computer system. A living locale-object replacement is provided on an operating system without shutdown of the operating system. A Locale-Object Management Daemon (LOMD) checks a predefined living locale object update profile, monitors status of a table of running application and correlated loaded locale-objects and decides if a locale object can be updated in certain nodes for certain applications.

18 Claims, 7 Drawing Sheets

(56) References Cited

OTHER PUBLICATIONS

Darvell, J. "No Reboot Kernel Patching—And Why You Should Care", Ninux Journal, Apr. 2015.
Appendix P—List of IBM Patents or Patent Applications Treated As Related Sep. 8, 2016.
Appendix P—List of IBM Patents or Patent Applications Treated As Related Oct. 11, 2016.

* cited by examiner

IMPLEMENTING LOCALE MANAGEMENT ON PAAS: LIVE LOCALE OBJECT UPDATE

FIELD OF THE INVENTION

The present invention relates generally to the data processing field, and more particularly, relates to method and apparatus for implementing system locale management including live locale object update.

DESCRIPTION OF THE RELATED ART

In an enterprise computing service, such as Platform as a Service (PaaS) or cluster, providing multicultural enablement support is one of critical features for supporting thousands of running application sessions under different languages, locales, and geographical locations.

In computing, a locale is a set of parameters that defines the user's language, region and any special variant preferences, collation, and regular expression rules that the user wants to see in their user interface. Usually a locale identifier consists of at least a language identifier and a region identifier.

Multicultural operating systems and applications use locales to determine the manner by which they perform processing on data, both with regard to inputs and outputs. The locale used by a multicultural operating system is typically represented as an object file that is used to identify a set of cultural conventions. These cultural conventions include, for example, information on collation, character classification, date/time format, monetary symbols, and numeric representations. In a multicultural operating system, a set of locale variables can be used to specify a user preferred language and culture environment. A multicultural application environment may be initialized, for example, by the Application Programming Interface (API), such as the setlocale ( ) API, to load the defined locale object (often compiled and shipped with OS as binary formal) from a specified path.

Each running OS system has a primary locale and multiple user/application selectable locales to serve different users and software applications for different regions and cultures. A single node of an Advanced Interactive Executive (AIX®) operating system (OS) available from International Business Machines Corporation of Armonk, N.Y., supports, for example, 81 languages and more than 600 locale objects, simultaneously.

Common Locale Data Repositories (CLDR), an IT standard, updates and changes locale names and locale definitions each year. More than 20-50% locale data including culture definitions and conventional rules, are updated every year by CLDR. Also, locale names can be changed often due to various reasons.

After changing locale names and locale definitions, OS vendors need to update locale contents; rebuild locale objects; ship updated locale file-sets; and update locales objects on the OS systems. After installing new updated system locales, system administrators usually need to reboot updated systems to ensure all applications will load updated locale objects. Modern technologies (such as logical partition and work load manager) can handle live application update and may also be used to update locale-object in real time as well with living locale-object replacement. After installing new updated system locales, there are risks to change application behaviors because of locale data changes. Risks result from collation rule changes; regular expression changes; and data output format changes. For instance, an indiscrimination locale-object replacement on a particular locale on a running system may cause errors from inconsistent monitory format.

Currently for a user, it is not clear if any changes will impact an application behaviors before a living locale-object replacement. And, it is hard to tell if a new change of system locale definitions has been taken by which application after living locale updating. From the standpoint of PaaS users, known locale management mechanisms do not enable either a risk assessment before applying a living locale-object replacement for applications running on their PaaS platforms, or living update status analysis report for each application after each living update.

A need exists for an efficient and effective method and apparatus for implementing system locale management including live locale object update.

SUMMARY OF THE INVENTION

Principal aspects of the present invention are to provide a method and apparatus for implementing system locale management including live locale object update in a computer system. Other important aspects of the present invention are to provide such method and apparatus substantially without negative effects and that overcome many of the disadvantages of prior art arrangements.

In brief, a method and apparatus are provided for implementing system locale management including live locale object update in a computer system. A living locale-object replacement is provided on an operating system without shutdown of the operating system. A Locale-Object Management Daemon (LOMD) checks a predefined living locale object update profile, monitors status of a table of running application and correlated loaded locale-objects and decides if a locale object can be updated in certain nodes for certain applications.

In accordance with features of the invention, if a locale object can be updated in a predefined node for all applications, then a living locale object update session is deployed.

In accordance with features of the invention, if a locale object cannot be updated in the predefined node due to one or more not-ready locale-update applications (NRLUA), then each NRLUA are moved to a different node, and then a living locale object update session is deployed on the predefined node.

In accordance with features of the invention, after updating, the locale object management daemon enables a real-time locale reloading agent to reload the latest locale-object as needed. After updating all locale objects, rebooting the OS is not required.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing system locale management. Dynamic locale object replacing and locale object re-loading on OS level are provided for supporting live locale object update on system locale management.

Figure 1:
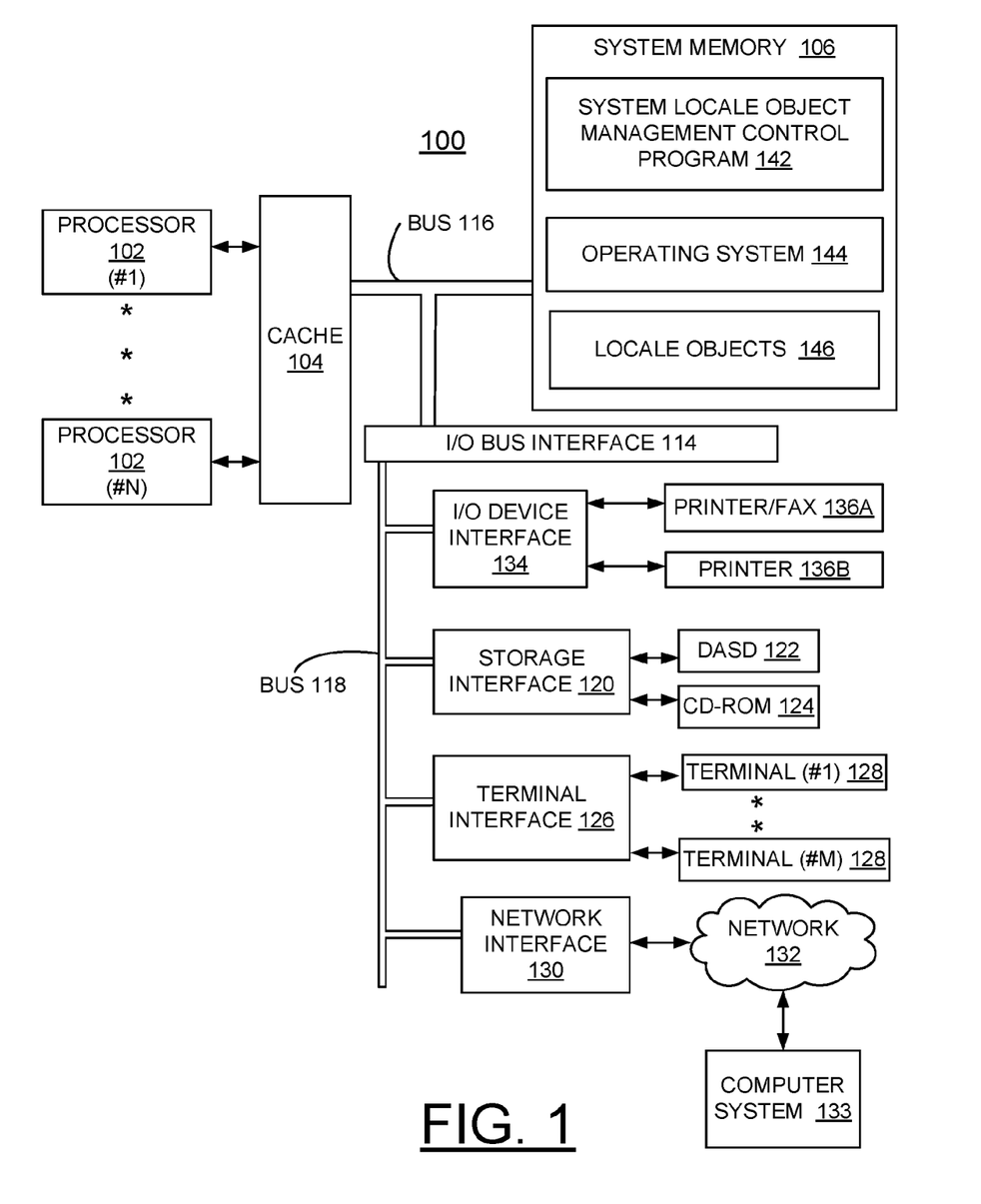
FIG. 1 is a block diagram of an example computer system for implementing system locale management in accordance with a preferred embodiment.

Having reference now to the drawings, in FIG. 1, there is shown a data processing computer system embodying the present invention generally designated by the reference character 100 for implementing system locale management including live locale object upgrade in accordance with the preferred embodiment. Data processing computer system 100 includes one or more processors 102 or general-purpose programmable central processing units (CPUs) 102, #1-N. As shown, data processing computer system 100 includes multiple processors 102 typical of a relatively large system; however, system 100 can include a single CPU 102. Data processing computer system 100 includes a cache memory 104 connected to each processor 102.

Data processing computer system 100 includes a system memory 106. System memory 106 is a random-access semiconductor memory for storing data, including programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, data processing computer system 100 includes a storage interface 120 coupled to storage devices, such as, a direct access storage device (DASD) 122, and a CD-ROM 124. Data processing computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

System memory 106 stores a system locale object management control program 142 for implementing system locale management including live locale object replacement update in accordance with the preferred embodiments, an operating system 144 and locale objects 146 in accordance with the preferred embodiments.

Data processing computer system 100 may be, for example, an IBM® eServer™ System P® computer system, running the Advanced Interactive Executive (AIX®) operating system or the LINUX® operating system. Data processing system 100 may be a symmetric multiprocessor (SMP) system including the plurality of processors 102.

In accordance with features of the invention, a locale management method is provided for living locale object update. A dynamic locale object replacing and locale object re-loading mechanism on OS level are provided for supporting live locale object upgrade on system locale management. A locale object management daemon is defined to check a predefined living locale object update profile, monitor status matrix of running application and correlated loaded locale-objects to decide if a locale object can be updated in certain nodes for certain applications.

In accordance with features of the invention, if a locale object can be updated in a given node A for all applications, then a living locale object update session is deployed. If a locale object cannot be updated in node A due to one or more not-ready locale-update applications (NRLUA), then those NR-LUA are moved to a different node (node-B), and the locale object update session is deployed on node A.

In accordance with features of the invention, after updating, the locale object management daemon can enable the real-time locale reloading agent to reload the latest locale-object as needed. For instance, the locale object management daemon can reload a new updated/usr/lib/nls/loc/en_US.UTF-8 for running Application-3, and reload another new updated/usr/lib/nls/loc/es_US.UTF-8 for running Application-1. All installed locale objects can be tracked, such as locale data, input method, keyboard mapping, and the like. The locale object management daemon does not to reboot the OS after updating all locale objects.

Figure 2:
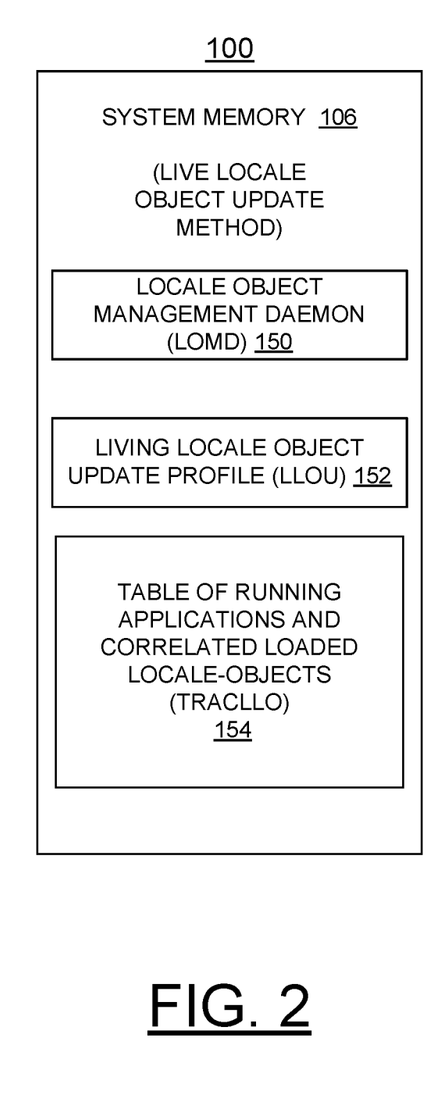
FIG. 2 is a block diagram of the memory system of FIG. 1 in accordance with a preferred embodiment.

Referring to FIG. 2, there is shown an example live locale object update method stored in memory system 106 of the data processing computer system 100 in accordance with a preferred embodiment. The method comprises a Locale-Object Management Daemon (LOMD) 150, a Living Locale-Object Update Profile (LLOU) 152, and a Table of Running Applications and Correlated Loaded Locale-Objects (TRACLLO) 154.

Figure 3A:
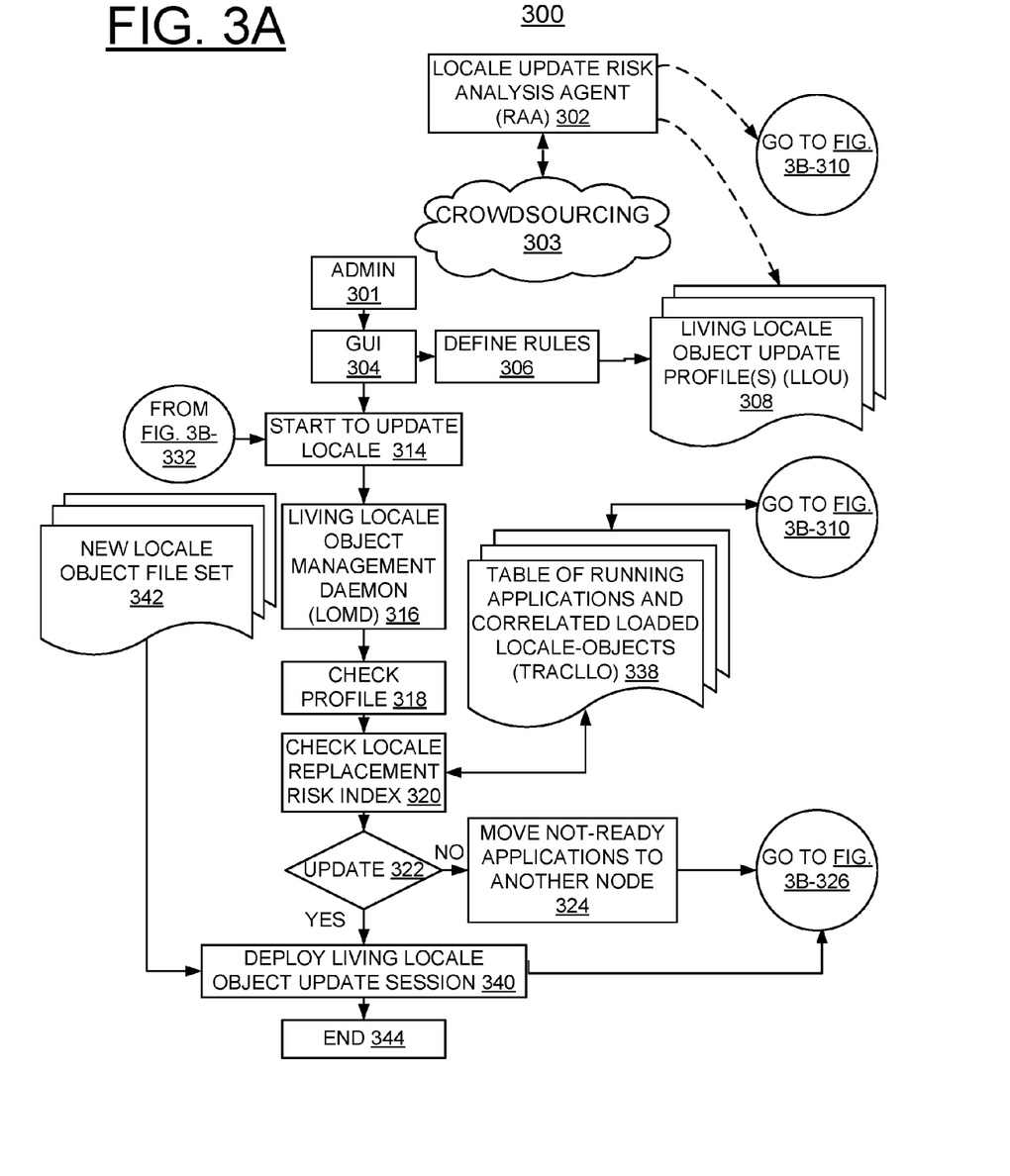
FIGS. 3A and 3B is a functional block and flow diagram illustrating a high level system design framework and operations in accordance with a preferred embodiment.
Figure 3B:
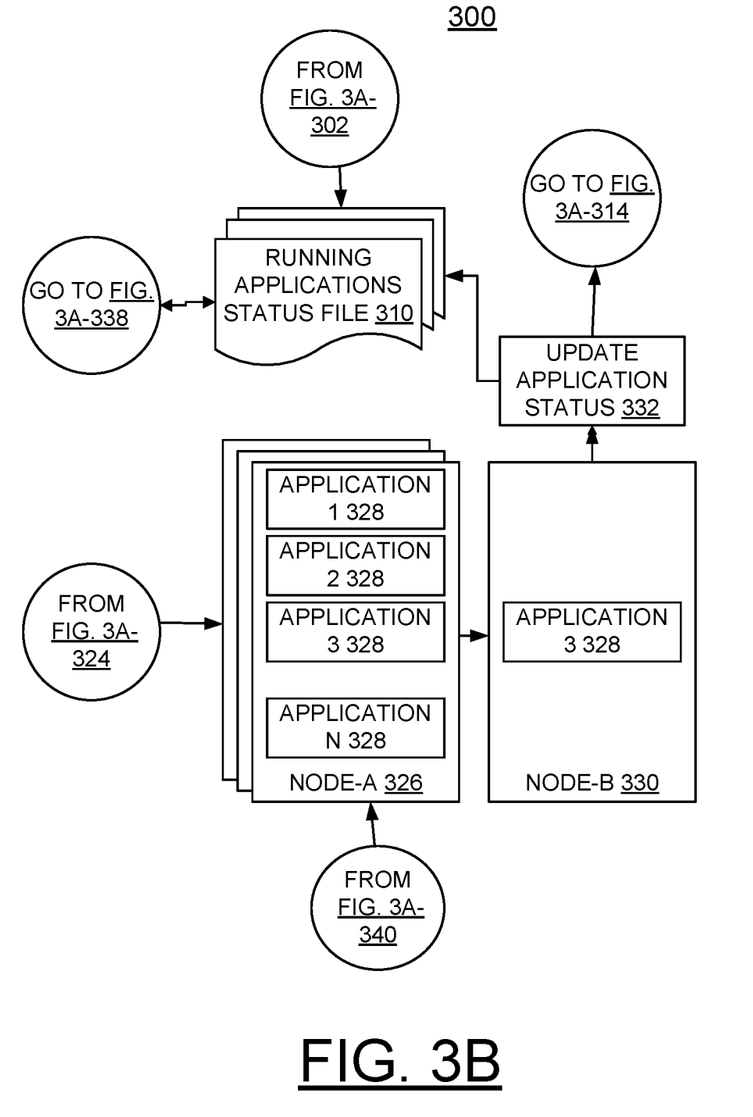

The Living Locale-Object Management Daemon (LOMD) 150 illustrated in FIGS. 3A and 3B can manage operations of living locale-object update through a living locale object management GUI interface; define, delete, modify rules on living locale object update profile; and move a locale sensitive application (not ready application) to another node before deploying a living locale-object update session; and deploy a living locale object update session.

The Living Locale-Object Update Profile (LLOU) 308 illustrated in FIGS. 3A and 3B is a set or records and rules in certain formats for defining rules and options of living locale object update.

The Table of Running Applications and Correlated Loaded Locale-Objects (TRACLLO) 338 illustrated in FIGS. 3A and 3B can be a matrix which includes information of running application status under certain locales.

Referring now to FIGS. 3A and 3B, there is shown a functional block and flow diagram illustrating a high level system design framework and operations generally designated by the reference character 300 in accordance with a preferred embodiment. At a block 301, a system administrator initiates an update. At block 302, a Locale Update Risk Analysis Agent (RAA) starts and is coupled to a crowdsourcing block 303, such as, for sharing updated living locale-object update profiles with other nodes or platforms to other PaaS users. A graphical user interface (GUI) 304 is initiated with rules defined at a block 306 and applied to Living Locale-Object Update Profiles (LLOU) at a block 308. The Locale Update Risk Analysis Agent (RAA) 302 is coupled to the Living Locale-Object Update Profiles (LLOU) 308. Locale Update Risk Analysis Agent (RAA) 302 is coupled to a Running Application Status File (RASF) at block 310 in FIG. 3B.

In FIG. 3A, at a block 314 an update locale is started and applied to a Living Locale-Object Management Daemon (LOMD) at block 316. At a block 318, a check profile is performed. Checking profile includes checking defined rules and options for the living local object update in a living local object update profile. A check locale replacement index at a block 320 is performed. Checking whether to update is performed as indicated at a decision block 322. If not, not-ready applications are moved to another node at a block 324, going to a block 326 in FIG. 3B.

In FIG. 3B, at a block 326 a node A is shown with a plurality of applications 1-N, 328 with an example application 3, 328 moved to a node B at a block 328, and coupled to an update application status at a block 332. The update application status 332 is coupled to the start to update locale at block 314 in FIG. 3A. In FIG. 3B, the update application status 332 is applied to the running applications status file 310. The running applications status file 310 is coupled to a Table of Running Applications and Correlated Loaded Locale-Objects (TRACLLO) at a block 338 in FIG. 3A.

In FIG. 3A, the Table of Running Applications and Correlated Loaded Locale-Objects (TRACLLO) 338 is applied to the check local replacement risk index 320. When update is identified at decision block 322, a living local object update session is deployed at a block 340, and a new locale object file set at a block 342 is applied. The deploy living local object update session at block 340 is coupled to the node A at block 326 with the plurality of applications 1-N, 328.

Figure 4A:
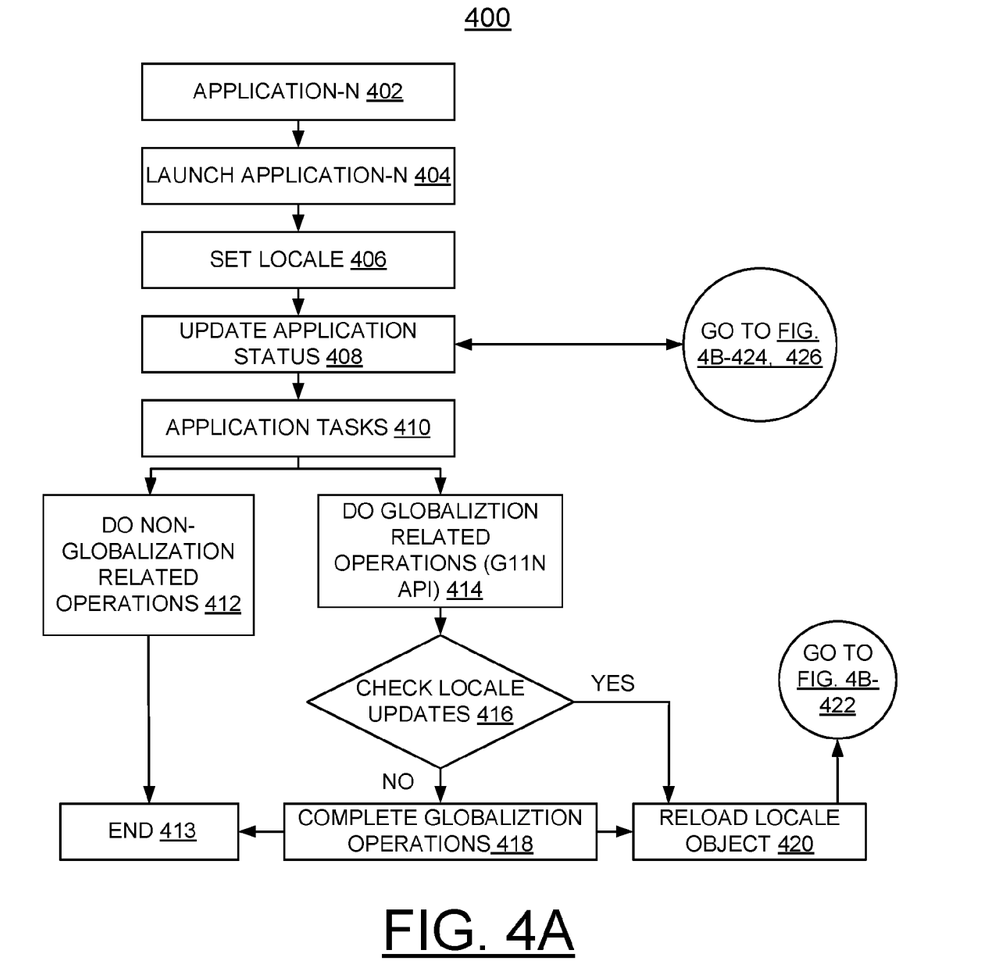
FIGS. 4A and 4B is a functional block and flow diagram illustrating living locale-object update and reload updated locale-object operations in accordance with a preferred embodiment.
Figure 4B:
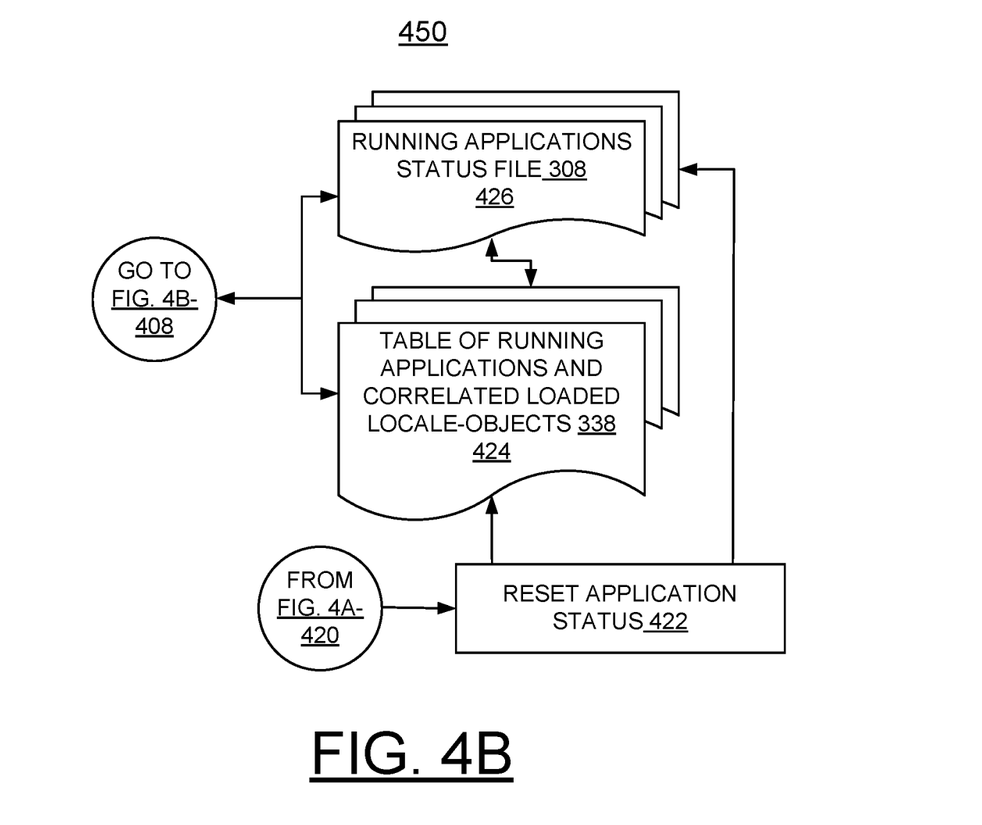

Referring now to FIGS. 4A and 4B, there is shown a functional block and flow diagram generally designated by the reference character 400 illustrating living locale-object update and reload updated locale-object operations in accordance with a preferred embodiment.

In FIG. 4A, an application is initiated at a block 402, and the application is launched at a block 404. A locale is set at a block 406, and the application status is updated at a block 408. Operations go to blocks 424, and 426 in FIG. 4B. At block 424 in FIG. 4B, updates are saved to the Table of Running Applications and Correlated Loaded Locale-Objects (TRACLLO) 338 and updates are saved to the Living Locale-Object Update Profiles (LLOU) 308 at block 426.

In FIG. 4A, application tasks are determined at a block 410. Non-globalization related operations are performed at a block 412 with operations ending at a block 413. Globalization related operations are performed at a block 414. Checking for locale updates is performed at a decision block 416. When locale updates are not identified, globalization operations are completed at a block 418 with operations ending at block 413. When locale updates are identified, the locale object is reloaded at a block 420. Operations go to block 422 in FIG. 4B. At block 422 in FIG. 4B, application status is reset and applied to running applications status file of the Living Locale-Object Update Profiles (LLOU) 308 at block 426 and applied to the Table of Running Applications and Correlated Loaded Locale-Objects (TRACLLO) 338 at block 424. Then operations return to block 408 in FIG. 4A to update the application status.

Figure 5:
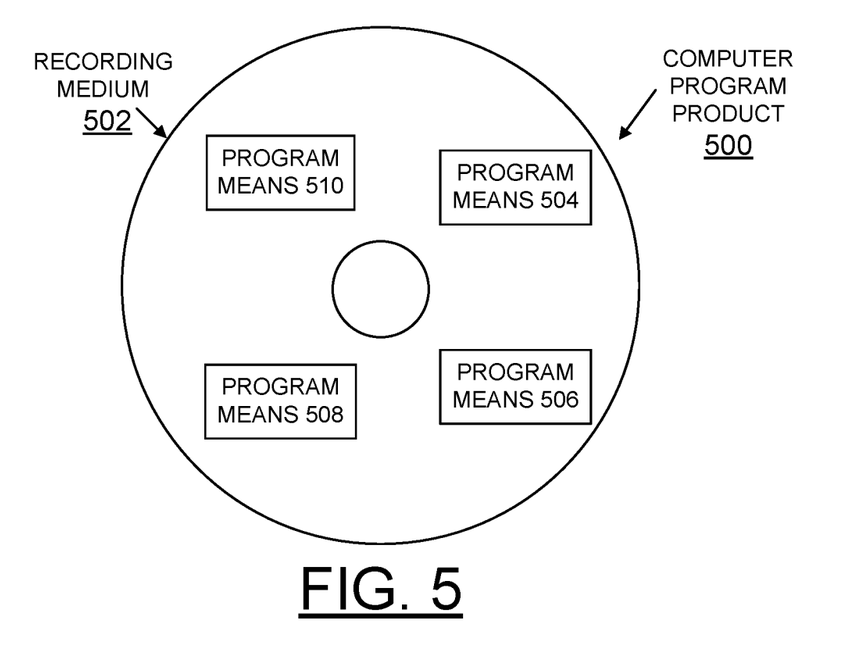
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing system locale management including live locale object update of the preferred embodiment in the system 100 of FIG. 1.

A sequence of program instructions or a logical assembly of one or more interrelated modules defined by the recorded program means 504, 505, 508, and 510, direct the system 100 for implementing system locale management including live locale object update of the preferred embodiment.

While the present invention has been described with reference to the details of the embodiments of the invention shown in the drawing, these details are not intended to limit the scope of the invention as claimed in the appended claims.

What is claimed is:

1. An apparatus for implementing system locale management including application and task oriented live locale object update in a computer system comprising: a processor, a Locale-Object Management Daemon (LOMD) tangibly embodied in a non-transitory machine readable medium used to implement live locale object update; said processor using said Locale-Object Management Daemon (LOMD), checking a predefined living locale object update profile, monitoring status of a table of running application and correlated loaded locale-objects, and making a selective living locale-object update decision in certain nodes for certain applications, and moving a not ready application to another node before deploying a selective living locale-object update session.

2. The apparatus as recited in claim 1 wherein checking said predefined living locale object update profile includes checking defined rules and options for the living local object update.

3. The apparatus as recited in claim 1 wherein checking said predefined living locale object update profile includes managing operations of living locale-object update through a living locale object management GUI interface.

4. The apparatus as recited in claim 1 wherein checking said predefined living locale object update profile includes defining, deleting, and modifying rules on the living locale object update profile.

5. The apparatus as recited in claim 1 includes deploying a living locale-object update session.

6. The apparatus as recited in claim 5 includes updating application status for the living locale-object update.

7. The apparatus as recited in claim 6 includes updating and saving application status into one or more living locale-object update profiles.

8. The apparatus as recited in claim 6 includes updating and storing running application status information under certain locales into a Table of Running Applications and Correlated Loaded Locale-Objects (TRACLLO).

9. The apparatus as recited in claim 1 includes reloading a living locale-object.

10. The apparatus as recited in claim 9 wherein making a living locale-object update decision in certain nodes for certain applications includes making the living locale-object update decision based on the locale replacement risk indexes stored in a living locale-object update profile.

11. A computer-implemented method for implementing system locale management including live locale object update in a computer system including a processor, and a Locale-Object Management Daemon (LOMD) tangibly embodied in a non-transitory machine readable medium used to implement live locale object update, said computer-implemented method comprising: checking a predefined living locale object update profile, monitoring status of a table of running application and correlated loaded locale-objects, and making a living locale-object update decision in certain nodes for certain applications, and moving a not ready application to another node before deploying a selective living locale-object update session.

12. The method as recited in claim 11 includes said Locale-Object Management Daemon (LOMD) includes checking defined rules and options for the living local object update in said predefined living locale object update profile.

13. The method as recited in claim 11 includes said Locale-Object Management Daemon (LOMD) managing operations of living locale-object update through a living locale object management GUI interface.

14. The method as recited in claim 11 includes said Locale-Object Management Daemon (LOMD) defining, deleting, and modifying rules on the living locale object update profile.

15. The method as recited in claim 11 includes said Locale-Object Management Daemon (LOMD) deploying a living locale-object update session.

16. The method as recited in claim 11 includes said Locale-Object Management Daemon (LOMD) updating application status for the living locale-object update.

17. The method as recited in claim 11 includes said Locale-Object Management Daemon (LOMD) updating and saving application status into one or more living locale-object update profiles, and updating and storing running application status information under certain locales into the table of running applications and correlated loaded locale-objects.

18. The method as recited in claim 11 includes said Locale-Object Management Daemon (LOMD) reloading a living locale-object.

* * * * *